United States Patent [19]

Asano

[11] 4,100,307
[45] Jul. 11, 1978

[54] DEVICE FOR PRODUCING A PIPE JOINT HAVING AN INTERNAL GROOVE THEREIN

[75] Inventor: Teryoshi Asano, Kawagoe, Japan

[73] Assignee: Sekisui Kagaku Kogyo Kabushiki Kaisha, Osaka, Japan

[21] Appl. No.: 857,945

[22] Filed: Dec. 6, 1977

Related U.S. Application Data

[63] Continuation of Ser. No. 642,632, Dec. 19, 1975, abandoned.

[30] Foreign Application Priority Data

Dec. 19, 1974 [JP] Japan .................... 49/146369

[51] Int. Cl.$^2$ .................................... B29D 23/03
[52] U.S. Cl. ................ 425/533; 425/535; 425/DIG. 218
[58] Field of Search ......... 425/533, 535, 522, 525, 425/387.1, 392, DIG. 218

[56] References Cited

U.S. PATENT DOCUMENTS

| 688,924 | 12/1901 | Blair et al. ............... 425/533 |
| 2,469,130 | 5/1949 | Rodman, Jr. ............. 425/533 |
| 3,809,517 | 5/1974 | Schneider ................ 425/533 |
| 3,982,871 | 9/1976 | Moddel .............. 425/DIG. 218 |

FOREIGN PATENT DOCUMENTS

| 714,462 | 7/1965 | Canada .................. 425/533 |
| 46-37093 | 11/1971 | Japan ................... 425/533 |

Primary Examiner—Richard B. Lazarus
Attorney, Agent, or Firm—Sughrue, Rothwell, Mion, Zinn and Macpeak

[57] ABSTRACT

A resin pipe joint is formed having a groove on the internal surface thereof adapted for receiving a seal. The mold for forming the pipe joint includes an external split mold and an internal mold core and sleeve with parts slidable relative to one another so that the elements form a space therebetween for injecting resin therein. Subsequently, while the injected resin is still in an unhardened state, the movable parts are moved to a second position relative to one another thereby providing an annular opening surrounding the resin body formed during the resin injecting step. A pressurized fluid is jetted through a passageway towards the internal periphery of the resin body to cause said resin body to bulge into the annular space thereby creating the internal groove or exteranl bulge in the resin body.

4 Claims, 4 Drawing Figures

DEVICE FOR PRODUCING A PIPE JOINT HAVING AN INTERNAL GROOVE THEREIN

This a continuation, of application Ser. No. 642,632, filed Dec. 19, 1975 and now abandoned.

BACKGROUND OF THE INVENTION

This invention relates to a devise for producing pipe joints made of synthetic resin and formed with a groove in the inner peripheral surface for fitting a seal ring therein.

Pipe joints made of synthetic resin are typically manufactured by an injection molding process. Although such processes are suitable for producing a large quantity of pipe joints of the same shape, there are certain drawbacks to using injection molding to produce articles having deep undercut portions in the inner periphery of a cylindrical article to be produced. For example, a mold for producing a joint with an undercut portion requires an extremely complicated mechanism, and as a result the mold is expensive and the process of removing the core of the mold from the molded article is very onerous and is liable to cause trouble.

SUMMARY OF THE INVENTION

The object of the present invention is to provide a device for producing pipe joints, having an inner groove for fitting a seal ring therein, without the above-named defects and without forming the groove after molding by machining or the like.

In accordance with the present invention, a novel device for producing a pipe joint according to a novel method comprises, a core, a sleeve axially slidably fitted on said core, and outer split molds adapted to enclose said core and sleeve to form a cylindrical duct therebetween. A resin is injected therein to form a cylindrical resin mold. An annular space is then formed along the external periphery of said cylindrical duct by moving the sleeve axially. The core is formed by a core body and an auxiliary core fitted slidably on a projection projecting axially of the core body. A fluid passage is provided in said core body or in the projection and opened at the peripheral wall portion of the base at the side of the core body of the projection. Fluid is jetted into the fluid passage to cause said resin mold to bulge into the annular space.

BRIEF DESCRIPTION OF THE DRAWINGS

FIGS. 1 through 3 are vertical sectional views showing the essential part of one example of the device according to the present invention, in which FIG. 1 shows a state where the molds are closed and positioned to form a cylindrical joint duct by injecting resin therein, FIG. 2 shows a state where an auxiliary core mold and sleeve are moved after resin has been injected to permit a jetted fluid to create a bulge in the joint, and FIG. 3 shows a state where the core mold and the sleeve are moved further and the outer split molds are opened.

DETAILED DESCRIPTION OF PREFERRED EMBODIMENT

Figure 1:
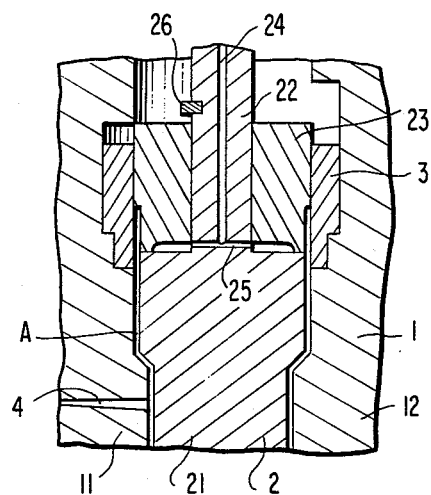

In the drawings, the numeral 1 designates split outer molds consisted of a fixed mold part 11 closed and a removable mold part 12. The part 12 may be lifted away from part 11 for the purpose of removing the pipe joint formed during the molding process.

An internal core mold 2 positioned within the outer mold 1 comprises a main body 21, a projection 22, and an auxiliary core mold body 23. The auxiliary core mold body 23 is fitted slidably on the projection 22 and is movable between the positions shown respectively in FIGS. 1 and 2. A stop element 26 on the projection 22 is provided to determine the proper position of the auxiliary mold relative to the main core mold body 21 during the fluid jetting step to be described subsequently. The projection 22 is provided with a fluid passage 24 which communicates with openings 25 at the point where projection 22 joins main core body 21. A sleeve 3, having an internal diameter substantially the same as that of said outer mold 1, is fitted slidably around said core mold as shown. A sprue runner 4 is provided in the outer mold fixed part 11 for injecting resin into the mold.

Figure 2:
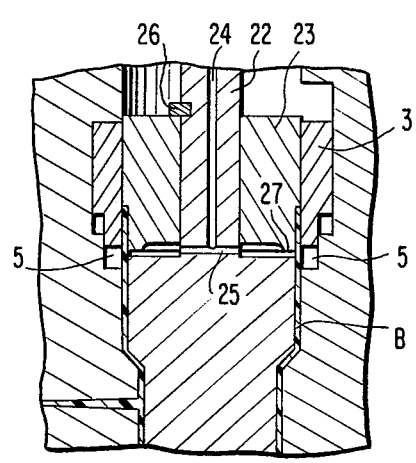
Figure 3:
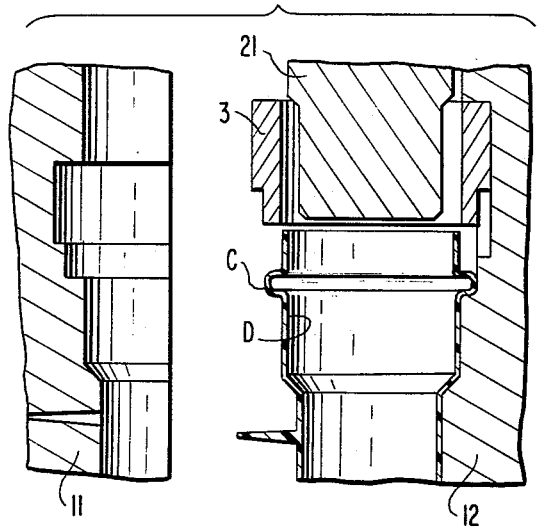

A pipe joint with an internal groove (corresponding to an external bulge) is formed by the following method using the device illustrated in FIGS. 1 through 3. The inner and outer mold elements as well as the sleeve 3 are positioned as illustrated in FIG. 1 initially to form a cylindrical duct A in the general shape of the pipe joint to be formed. Subsequently, resin is injected into the cylindrical duct A via sprue runner 4. The molded resin pipe joint formed at this intermediate stage of the operation has a shape determined by the shape of the cylindrical duct. The cylindrical mold body is shown at B in FIG. 2. While the cylindrical molded body B is still in an unhardened state, the auxiliary mold 23 and the sleeve 3 are moved to the positions illustrated in FIG. 2 in preparation for the fluid injecting step of the method. As can be seen from FIG. 2, the movement of sleeve 3 in the upward direction creates an annular opening 5 surrounding the molded body B near the upper end thereof. Also, the upward movement of the auxiliary core 23 permits communication between fluid passage 24 and the internal periphery of body B, adjacent annular opening 5, via openings 25 and newly created openings 27. it will be seen that the openings 27 are newly created as a result of the movement of auxiliary core member 23.

With the core and sleeve elements in the position illustrated in FIG. 2, and with the body B still in an unhardened state, a fluid under pressure is injected into the passage 24 thereby causing a uniform bulging of the resin body into the annular opening 5 to create the deformity C shown on the cylindrical pipe D in FIG. 3. The part C is an internal annular groove and an external annular bulge. Thereafter the resin is cooled and solidified and a pipe joint having the bulge portion C is removed from the mold. Removal is accomplished by retracting the core mold 2 (in the upper direction in FIGS. 1 through 3), retracting the sleeve 3 in the same direction, and lifting off the removable part 12 of the outer split mold 1. Thereafter, all of the elements may be replaced to the positions illustrated in FIG. 1 for formation of a subsequent pipe joint.

As will be appreciated by anyone having ordinary skill in the art, the resin is injected via the sprue runner 4 from a conventional injection molding machine not illustrated in the drawings. Furthermore, the removable part 12 of the split outer mold 1, the core body 2, the sleeve 3, and the auxiliary core mold 23 may all be driven to the predetermined positions by conventional machinery such as an oil pressure device.

Figure 4:
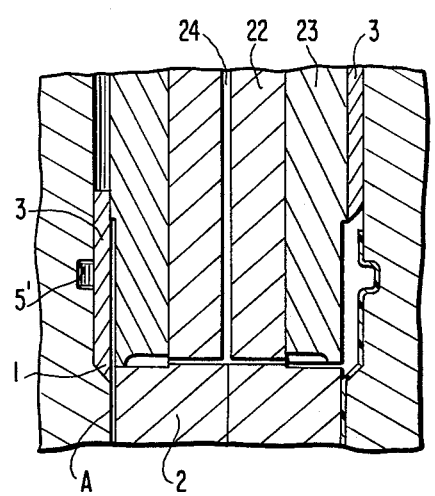
FIG. 4 is a vertical sectional view showing essential part of another example, wherein the left half of the drawing shows a state where the outer split molds, core molds, etc. are closed to form a cylindrical duct, while on the right half, there is shown a state where a part of the injected resin is bulged.

An alternative embodiment of the device of the present invention is illustrated in FIG. 4. FIG. 4 is a split figure illustrating the position of the elements during two different stages of the operation. For example, the sleeve 3 and the auxiliary core 23 are shown on the left hand side of FIG. 4 in the position they occupy during the resin injection stage of the process. The same elements are shown on the right hand side of FIG. 4 in the positions they occupy during the fluid jetting step of the process. As can be seen, the embodiment of FIG. 4 differs from the embodiment of FIGS. 1 through 3 in that an annular space 5', adapted to receive the bulged portion exist in the internal periphery of the outer mold and is external to the sleeve 3 when the sleeve 3 is in the position for a resin injection. When the sleeve 3 is moved to the position (shown on the right) for fluid jetting, there is an additional annular space between the molded body and the internal periphery of the outer mold 1. Therefore, in this embodiment the jetted fluid forces the entire upper end of the resin body against the internal wall of the outer mold while at the same time pushing a part of said body into the annular opening 5' to form the bulge.

As stated above, the device according to the present invention is so adapted that an annular space is formed along the external periphery of the cylindrical duct by the transfer of the sleeve, and by bulging the resin, which has been injected in the cylindrical duct, into said annular space, a pipe joint having a recessed groove on the inner peripheral surface or bulged portion can be obtained easily. Furthermore, the core mold is formed by a core mold body and an auxiliary core mold fitted slidably on a projection projecting axially of said core body, and the fluid passage, which is formed in the core mold body or in its projection, is opened at the outer periphery on the base portion of the projection. When resin is injected into the cylindrical duct, both the end surfaces of the core mold body and the auxiliary core mold contact each other perfectly to block the fluid outlet to thereby prevent resin from entering into the fluid outlet. Thereafter the auxiliary mold is moved axially to form a gap over all of the periphery between the end surface at the side of the projection of the core mold body and the end surface of the auxiliary core mold. The gap communicates with the fluid passage, and the fluid, jetted therethrough onto the inner periphery resin body, presses and bulges said resin body in such a uniform manner so that there is no defect producing wrinkle at the bulging portion or uneven bulging, such as that which resulted from prior art molds because of earlier bulging at the wall surface of the jetting portion when the fluid was jetted from several places as in the case, for example, where check valves are provided at several places in the outer peripheral surface of the core mold. Thus by the present invention a uniform bulged portion is formed.

What is claimed is:

1. An apparatus for forming a resin pipe joint having a groove on the internal surface thereof, comprising:
    (a) an internal core comprising, a main core body, a projection positioned to define fluid opendings between the base of said main core body and said projection, an auxiliary core member slidable axially on said projection between at least a first position in which said auxiliary core tightly contacts the base of said main core body and a second position which defines an annular gap between said main core body and said auxiliary core member, said gap communicating with said fluid openings, and a fluid passage in said internal core communicating with said fluid openings;
    (b) an outer mold surrounding said internal core;
    (c) a sleeve slidable axially on said auxiliary core and within said outer mold from a first position to a second position, said auxiliary core, said outer mold and said sleeve defining a cylindrical resin receiving space when said sleeve is in said first position and defining said cylindrical resin receiving space plus an additional bulge receiving space communicating with said cylindrical resin receiving space when said sleeve is in said second position;
    (d) means for introducing resin into said cylindrical resin receiving space when said sleeve and said auxiliary core members are in their respective first positions to form a resin pipe structure;
    (e) means for moving said auxiliary core member and sleeve between their respective first and second positions; and
    (f) means for introducing fluid under pressure into said fluid passage at least when said sleeve and said auxiliary core members are in their respective second positions to cause said fluid to pass through said fluid openings and said annular gap and pressurize a portion of said resin pipe structure into said bulge receiving space.

2. An apparatus as recited in claim 1, wherein said bulge receiving space comprises an annular space which is occupied by said sleeve when said sleeve is in its first position and which does not exist until said sleeve is moved to its second position.

3. An apparatus as recited in claim 2, wherein said bulge receiving space further comprises an annular groove in said outer mold which surrounds said sleeve when said sleeve is in its first position and which surrounds and communicates with said annular space when said sleeve is in its second position.

4. An apparatus as recited in claim 1, wherein the internal diameters of said sleeve and said outer mold are substantially equal.

* * * * *